United States Patent
Mastromatteo et al.

(10) Patent No.: US 8,466,599 B2
(45) Date of Patent: Jun. 18, 2013

(54) ELECTROSTATIC MICROMOTOR WITH STATOR AND ROTOR IN CONTACT, IN PARTICULAR FOR PROBE-STORAGE SYSTEMS

(75) Inventors: Ubaldo Mastromatteo, Bareggio (IT); Bruno Murari, Monza (IT); Giulio Ricotti, Broni (IT); Marco Marchesi, Borgonovo Val Tidone (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 881 days.

(21) Appl. No.: 12/533,850

(22) Filed: Jul. 31, 2009

(65) Prior Publication Data

US 2010/0026138 A1  Feb. 4, 2010

(30) Foreign Application Priority Data

Jul. 31, 2008 (IT) ............................. TO2008A0603

(51) Int. Cl.
*H02N 1/00* (2006.01)
(52) U.S. Cl.
USPC ...................................................... 310/309
(58) Field of Classification Search
USPC ...................................................... 310/309
See application file for complete search history.

(56) References Cited

U.S. PATENT DOCUMENTS

| | | |
|---|---|---|
| 5,541,465 A | 7/1996 | Higuchi et al. |
| 6,680,558 B2 * | 1/2004 | Akiba et al. .................. 310/309 |
| 7,948,337 B2 * | 5/2011 | Chu et al. ........................ 335/78 |
| 2006/0006759 A1 | 1/2006 | Matsuki |
| 2007/0181411 A1 * | 8/2007 | Ikehashi et al. ............... 200/181 |

FOREIGN PATENT DOCUMENTS

| | | |
|---|---|---|
| EP | 0 265 118 A1 | 4/1988 |
| EP | 1 580 876 A2 | 9/2005 |

OTHER PUBLICATIONS

Baratoff, A. et al., "Justification of a novel mechanism for the efficient suppression of atomic-scale friction," International Conference on Nanoscience and Technology, Basel, Switzerland, Jul. 30-Aug. 4, 2006.
Fujita, H. et al., "Position Control of an Electrostatic Linear Actuator Using Rolling Motion," Mechatronics 2(5):495-502, 1992.
Tsai, C. C. et al., "The effect of friction reduction in the presence of in-plane vibrations," Arch. Appl. Mech. 75:164-176, 2006.

* cited by examiner

*Primary Examiner* — Tran Nguyen
*Assistant Examiner* — Leda Pham
(74) *Attorney, Agent, or Firm* — Seed IP Law Group PLLC

(57) ABSTRACT

In an electrostatic micromotor, a mobile substrate faces a fixed substrate and is suspended over the fixed substrate at a given distance of separation in an operative resting condition; an actuation unit is configured so as to give rise to a relative movement of the mobile substrate with respect to the fixed substrate in a direction of movement during an operative condition of actuation. The actuation unit is also configured so as to bring the mobile substrate and the fixed substrate substantially into contact and to keep them in contact during the operative condition of actuation. The electrostatic micromotor is provided with an electronic unit for reducing friction, configured so as to reduce a friction generated by the contact between the rotor substrate and the stator substrate during the relative movement.

40 Claims, 4 Drawing Sheets

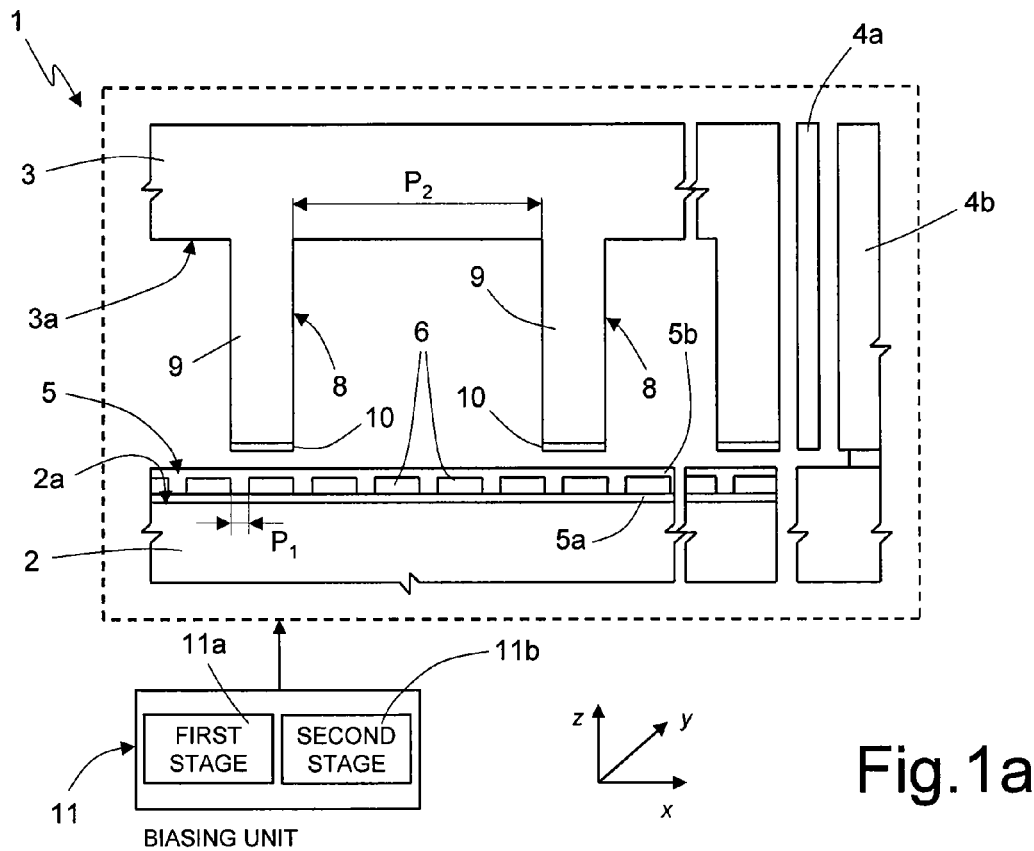
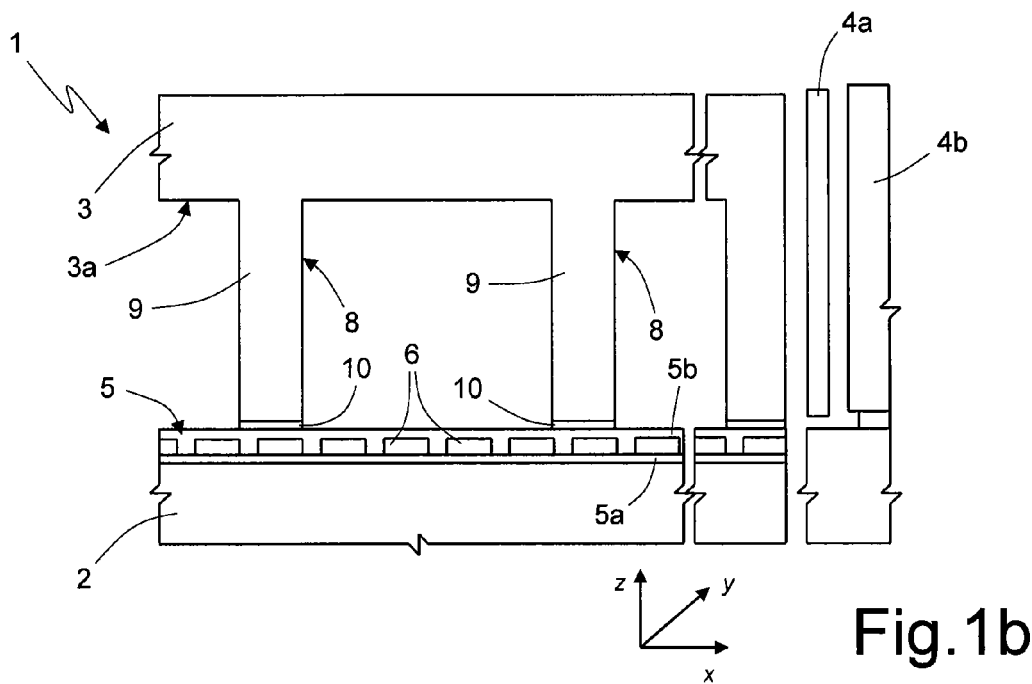

ELECTROSTATIC MICROMOTOR WITH STATOR AND ROTOR IN CONTACT, IN PARTICULAR FOR PROBE-STORAGE SYSTEMS

BACKGROUND

1. Technical Field

The present disclosure relates to an electrostatic micromotor with stator and rotor in contact, in particular for atomic-level storage systems (generally known as "probe-storage systems"), to which the ensuing treatment will make reference without implying any loss of generality.

2. Description of the Related Art

As is known, storage systems that exploit a technology based on magnetism, such as, for example, hard disks, suffer from important limitations as regards the increase in the data-storage capacity and the read/write speed, and the decrease in their dimensions. In particular, a physical limit exists, the so-called "superparamagnetic limit", that hinders the reduction in the dimensions of the magnetic-storage domains below a critical threshold, if the risk of losing the stored information is to be avoided.

In the last few years, alternative storage systems have consequently been proposed, amongst which the so-called "probe-storage systems" have assumed particular importance. These systems enable high data-storage capacities to be achieved in reduced dimensions and with low production costs.

In summary, probe-storage systems envisage the use of a two-dimensional array of transducers (or probes) fixed to a common substrate and each provided with a respective read/write head. The two-dimensional array is positioned above a storage medium (e.g., made of polymeric material, ferroelectric material, phase-change material, etc.), and is relatively mobile with respect thereto.

Each probe can be actuated for interacting locally with a portion of the storage medium, for writing, reading or erasing individual information bits. In particular, the relative movement between the storage medium and the array of transducers is generated by a micromotor coupled to the storage medium.

In this connection, electrostatic micromotors are known for generating a linear movement, which are obtained with semiconductor-micromachining technologies (the so-called "MEMS technologies"). These electrostatic micromotors base their operation on a capacitive interaction between a fixed substrate (known as "stator") and a mobile substrate that is able to move with respect to the fixed substrate (known as "rotor", without this term implying, however, the presence of a rotary movement).

The rotor substrate is generally suspended over the stator substrate via elastic elements, at a distance of separation (gap) of, for example, a few microns. Electrostatic-interaction elements carried by the rotor substrate and stator substrate, for example, rotor and stator electrodes arranged in an appropriate way on respective facing surfaces, determine, when suitably biased, a relative movement of translation of the rotor substrate with respect to the stator substrate in a sliding direction. In particular, the stator electrodes and rotor electrodes form capacitors with plane parallel faces that are misaligned. When an appropriate biasing voltage is applied between the misaligned faces, an electrostatic interaction force is generated, which tends to bring them back into a position of mutual alignment.

In detail, the electrostatic interaction force thus generated has a useful component along the sliding direction, which determines the relative movement between the rotor substrate and the stator substrate, and also a disturbance component oriented in a direction orthogonal to the sliding direction, which tends to bring the two substrates closer to one another, generating undesirable oscillations of the rotor substrate in the orthogonal direction.

In a known way, one of the main targets in the development of electrostatic micromotors is to reduce the effects of the disturbance component of the electrostatic interaction force. For this purpose, an attempt is made, for example, to maximize the useful component with respect to the disturbance component or, equivalently, to maximize the ratio between the useful component and the disturbance component of the electrostatic interaction force. In particular, it is in any case desirable to guarantee a minimum target of stability of the rotor substrate as regards the deformations in the orthogonal direction (e.g., the deformations should be less than 100 nm, considering a thickness for the rotor substrate of approximately 400 µm). It is evident that this target of stability is extremely stringent, in particular as regards the stiffness of the elastic elements, which may need to counter the undesirable movement of the rotor substrate due to the electrostatic interaction force in the orthogonal direction.

BRIEF SUMMARY

One embodiment provides an electrostatic micromotor that represents an improvement over the known art, and in particular that enables reduction of an undesirable effect of the aforesaid disturbance component of the electrostatic interaction force that is generated in use between the stator substrate and the rotor substrate.

One embodiment is an electrostatic micromotor comprising a fixed substrate and a mobile substrate facing said fixed substrate and suspended over said fixed substrate at a given separation distance in an operative resting condition. An actuation unit is configured to cause a relative movement of said mobile substrate with respect to said fixed substrate along a direction of movement during an operative actuation condition. The actuation unit is further configured to bring said mobile substrate and said fixed substrate substantially into contact and to keep them in contact during said operative actuation condition.

One embodiment is a method for actuating an electrostatic micromotor. The micromotor is provided with a fixed substrate and a mobile substrate facing said fixed substrate and suspended over said fixed substrate at a given separation distance while in an operative resting condition. In one embodiment the method comprises bringing said mobile substrate and said fixed substrate into contact and keeping them in contact during an operative actuation condition and causing a relative movement of said mobile substrate with respect to said fixed substrate along a direction of movement during the operative actuation condition.

BRIEF DESCRIPTION OF THE SEVERAL VIEWS OF THE DRAWINGS

Embodiments are now described, purely by way of non-limiting example and with reference to the attached drawings, wherein:

FIG. 1a shows a cross section of an electrostatic micromotor according to a first embodiment, in a first operating condition;

FIG. 1b shows a cross section of the micromotor of FIG. 1a, in a second operating condition;

DETAILED DESCRIPTION

Figure 2:
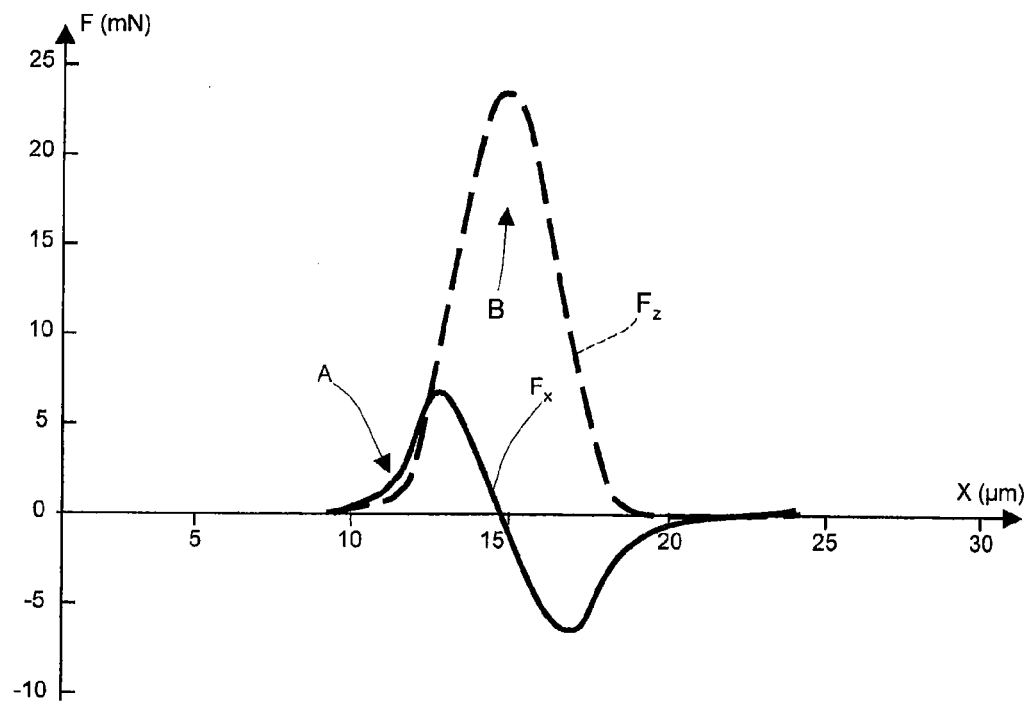
FIGS. 2 and 3 show plots of electrical and mechanical quantities in the micromotor of FIGS. 1a, 1b.

As will be described in detail in what follows, one embodiment envisages that the rotor substrate and the stator substrate of an electrostatic micromotor are set and kept in mutual contact during an operative condition of actuation of the electrostatic micromotor. This contact renders substantially negligible the effects of a disturbance component of the electrostatic interaction force in a direction orthogonal to a direction of relative movement of the rotor substrate with respect to the stator substrate (the stator substrate constituting, in fact, a position reference for the rotor substrate in the orthogonal direction).

In detail, and as is shown in FIG. 1a (which is not drawn to scale, as neither are the subsequent figures), an electrostatic micromotor 1, made using semiconductor technologies, comprises a stator substrate 2, and a rotor substrate 3 set above the stator substrate 2. Typically, both the rotor substrate 3 and the stator substrate 2 are made of semiconductor material (e.g., silicon). In a resting condition (i.e., with the micromotor not actuated), the rotor substrate 3 is suspended over the stator substrate 2 at a distance of separation, for example, of approximately 0.5 µm. Elastic elements 4a (shown schematically in FIG. 1) connect the rotor substrate 3 to an anchorage structure 4b, rigidly anchored to the stator substrate 2 (in a per-se known manner that is not described in detail herein).

A first insulation layer 5a, made, for example, of silicon oxide, is provided on a facing surface 2a of the stator substrate 2 facing the rotor substrate 3; on the first insulation layer 5a a plurality of stator electrodes 6, made of conductive material, for example, polysilicon or metal, is provided. Electrical contacts (not illustrated), arranged in an appropriate way, are connected to the stator electrodes 6 for enabling biasing thereof at desired voltages. The stator electrodes 6 are arranged at regular distances and spaced apart by a first pitch $P_1$ in a sliding direction x, along which a relative movement of linear translation between the stator substrate 2 and the rotor substrate 3 occurs. The stator electrodes 6 have (as is shown hereinafter) a shape elongated in a direction of extension y, orthogonal to the sliding direction x. A further insulation layer 5b coats the first insulation layer 5a and the stator electrodes 6. The first insulation layer 5a and the further insulation layer 5b are conveniently made of one and the same dielectric material (e.g., silicon oxide) so as to form a uniform layer (which will be referred to in what follows as "resulting insulation layer" 5), in which the stator electrodes 6 are englobed. For example, the further insulation layer 5b is formed by deposition and is subsequently planarized (for example with the CMP—Chemical Mechanical Polishing—technique) to obtain a substantially plane top surface.

The rotor substrate 3 has a plurality of rotor indentations (or rotor pits) 8, which are open at a respective facing surface 3a facing the stator substrate 2. As will be shown hereinafter, the rotor indentations 8 also have a shape elongated in the direction of extension y, and extend into the rotor substrate 3 in an orthogonal direction z, perpendicular to the sliding direction x and to the direction of extension y. The rotor indentations 8 are obtained, for example, by means of anisotropic chemical etching, have facing and substantially rectilinear vertical side walls, and define between them rotor projections (or rotor teeth) 9, facing the stator substrate 2 and the corresponding stator electrodes 6. The rotor projections 9 are arranged at regular distances, spaced apart by a second pitch $P_2$, greater than the first pitch $P_1$, in the sliding direction x. Dielectric regions 10, made, for example, of silicon oxide, are formed (e.g., by deposition, or thermal growth) on the surfaces of the rotor projections 9 facing the stator electrodes 6.

In particular, the arrangement of the stator electrodes 6 with respect to the rotor projections 9 is periodic (consequently, stator electrodes 6, separated by a given interval in the sliding direction x, come to be in one and the same position with respect to an overlying rotor indentation 8 or rotor tooth 9). In the embodiment illustrated in FIG. 1, the first pitch $P_1$ is 1 µm, and the width (in the sliding direction x) of the stator electrodes 6 is 2 µm; the second pitch $P_2$ is, instead, 12 µm, and the width of the rotor projections 9, which extend in the orthogonal direction z for a depth of 20 µm, is 3 µm. The stator electrodes 6 are staggered with respect to the rotor projections 9 in the sliding direction x, and the arrangement of the electrodes is repeated in a periodic way every five stator electrodes 6.

The electrostatic micromotor 1 further comprises an electronic biasing unit 11, shown schematically in FIG. 1, designed to generate electrical signals 11 for biasing the stator electrodes 6 and/or the rotor projections 9 so as to control actuation of the electrostatic micromotor 1. In particular, the rotor substrate 3 (and consequently the rotor projections 9) are generally kept at a reference potential (ground voltage), whilst appropriate biasing voltages are applied to the stator electrodes 6 (in particular, one and the same biasing voltage is applied to stator electrodes 6 that are in the same relative position with respect to corresponding rotor indentations 8 or rotor projections 9).

According to one embodiment, the electronic biasing unit 11 comprises a first biasing stage 11a and a second biasing stage 11b, which are designed to operate in a distinct and uncoupled way for biasing the stator electrodes 6.

In particular, during actuation of the electrostatic micromotor 1, the first biasing stage 11a acts on a first set of stator electrodes 6 so as to generate a contact force $F_c$ oriented substantially in the orthogonal direction z, such as to bring the stator substrate 2 and the rotor substrate 3 closer to one another until they are brought into a condition of mutual contact. As is shown in FIG. 1b, which illustrates an operative condition of actuation of the electrostatic micromotor 1, the elastic elements 4a undergo deformation in such a way as to close the gap between the rotor projections 9 and the underlying resulting insulation layer 5. The contact force $F_c$ is greater than a force of elastic reaction of the elastic elements 4a (in such a way as to cause deformation thereof) and is such as to compensate for possible external forces, such as the weight or shocks of various kinds, which would tend to move the rotor substrate 3 away from the stator substrate 2 and modify the condition of mutual contact. To maintain the coupling between the substrates in any condition during actuation (e.g., with any spatial orientation of the electrostatic micromotor 1, or in the presence of marked external vibrations), the contact force $F_c$ satisfies the following relation:

$$F_c > K_z \cdot g + F_{ext}$$

where $K_z$ is the elastic constant of the elastic elements 4a in the orthogonal direction z (e.g., 5.6 kN/m), g is the gap between the rotor substrate 3 and the stator substrate 2 in the resting condition, and $F_{ext}$ is the resultant in the orthogonal direction z of external forces acting on the electrostatic micromotor 1.

During actuation of the electrostatic micromotor 1, the second biasing stage 11b acts on a second set of stator electrodes 6, which is distinct at any given instant in time from the aforesaid first set of electrodes, to generate an actuation force oriented substantially in the sliding direction x and such as to generate the desired movement of translation of the rotor substrate 3 with respect to the stator substrate 2.

Conveniently, the electrostatic micromotor 1 comprises a system of switches (not illustrated), which are designed to connect the first and second biasing stages 11a, 11b selectively to the individual stator electrodes 6, independently of one another, and timed according to a pre-set logic.

FIG. 2 shows a portion of the theoretical plot of the electrostatic interaction force acting on a single stator electrode 6, when it is biased constantly at a given voltage (e.g., 100V), as a function of the relative position with respect to the rotor substrate 3 in the sliding direction x (and in particular with respect to overlying rotor indentations 8 and rotor projections 9). The origin O corresponds to the start of a given rotor indentation 8. In particular, a longitudinal component $F_x$ of the electrostatic interaction force oriented in the sliding direction x, and a transverse component $F_z$ of the same electrostatic interaction force oriented in the orthogonal direction z are represented with a solid line and with a dashed line, respectively. As may be noted, in a first area, designated by A (in particular, situated below a rotor indentation 8, in the proximity of a subsequent rotor projection 9), the longitudinal component $F_x$ is greater than the transverse component $F_z$ (which is also sensibly lower than the force of elastic reaction of the elastic elements 4a); and in a second area, designated by B (in particular, situated below the subsequent rotor projection 9), the transverse component $F_z$ is maximum and the longitudinal component $F_x$ is substantially negligible.

The first and second biasing stages 11a, 11b are configured so as to bias the stator electrodes 6 in a discontinuous way as a function of their position with respect to the rotor substrate 3, and in particular only when they are in a given relative position with respect to the rotor substrate 3.

In detail, the first biasing stage 11a is configured so as to bias with a first biasing signal $V_z$, at any instant of actuation of the electrostatic micromotor 1, stator electrodes 6 that are under the rotor projections 9, in a region corresponding to the aforesaid area B. The first biasing stage 11a consequently gives rise to a resultant force in the orthogonal direction z (the contact force $F_c$), substantially without generating an appreciable force in the sliding direction x, and thus substantially without contributing to the movement of the rotor substrate 3 in this direction. In particular, it may be noted that, advantageously, in the aforesaid area B, a biasing voltage of not particularly high value is sufficient for generating a high force of attraction to bring the stator substrate 2 and the rotor substrate 3 into contact and keeping them in contact.

Instead, the second biasing stage 11b is configured so as to bias, with a second biasing signal $V_x$ (e.g., a voltage signal of constant value, for example, comprised between 10 V and 20 V), stator electrodes 6 that each time come to be under the rotor indentations 8, and in particular in a region corresponding to the aforesaid area A. In this way, the second biasing stage 11b gives rise to a force of actuation in the sliding direction x, controlling the movement of translation of the rotor substrate 3, without being affected by any appreciable disturbance in the orthogonal direction z.

According to one embodiment, the electronic biasing unit 11 is further configured so as to reduce a force of friction that is generated during the movement of translation, on account of the contact between the stator substrate 2 and the rotor substrate 3. For this purpose, the force of reaction of the elastic elements 4a is exploited for generating a high-frequency "modulation" of the contact force $F_c$, and thus generating vibrations at a microscopic level of the rotor substrate 3 in the orthogonal direction z (the so-called "superlube" modulation). In fact, partially based on studies conducted for different applications—see, for example, A. Baratoff, A. Socoliuc, E. Gnecco, E. Meyer "Justification of a Novel Mechanism for the Efficient Suppression of Atomic-Scale Friction", International Conference on Nanoscience and Technology 2006, Basel (Switzerland), Jul. 30 to Aug. 4, 2006; or "The effect of friction reduction in the presence of in-plane vibrations", C. C. Tsai, C. H. Tseng, Arch. Appl. Mech. (2006) 75, pp. 164-175—the present Applicant has verified that a modulation of the contact force $F_c$ between the stator substrate 2 and the rotor substrate 3 enables a considerable reduction in the sliding friction, and in particular enables a force of friction to be obtained having a mean value reduced even by up to two orders of magnitude with respect to the case where the contact force is constant over time.

Figure 3:
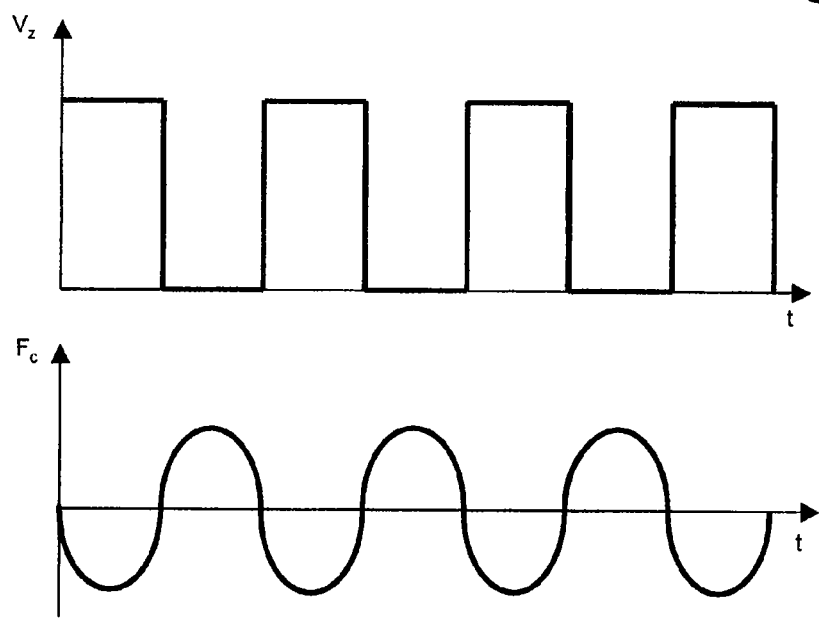

In detail, and as is shown in FIG. 3, the first biasing stage 11a, once the stator substrate 2 and the rotor substrate 3 have been brought into contact, is configured so as to apply to the stator electrodes 6 a first biasing signal $V_z$ having an intermittent pattern, in particular a pulse-train pattern. The contact force $F_c$ consequently assumes a substantially sinusoidal pattern, with alternation of a force of attraction (due to the electrostatic interaction force), in the presence of the biasing voltage, and a force of repulsion (due to the force of reaction of the elastic elements 4a), with zero biasing voltage. In particular, when the biasing voltage assumes a zero value, there is a relaxation of the contact force between the stator substrate 2 and the rotor substrate 3, which enables a reduction in the force of friction.

The first biasing signal $V_z$ has a frequency higher than a natural mechanical cut-off frequency of the mechanical system constituted by the rotor substrate 3 and the associated elastic elements 4a, in such a way as not to cause a macroscopic displacement of the same rotor substrate 3 and a recession thereof from the stator substrate 2. For example, in the case where the aforesaid mechanical system has a natural frequency in the orthogonal direction z of less than 500 Hz, frequencies of around 25 kHz produce infinitesimal displacements of the rotor substrate 3. However, a vibration is generated in a direction transverse to the sliding direction x, which has been shown to reduce the force of friction that opposes the movement.

One embodiment (FIG. 4) envisages the interposition between the stator substrate 2 and the rotor substrate 3 of supporting spacer elements 14 (in what follows defined as "pads"), made of a material with a low coefficient of friction (e.g., 0.1), for example, diamond-like carbon (DLC), or else another material with similar properties, such as silicon carbide (SiC), arranged in a distributed manner between the stator electrodes 6 and the rotor projections 9. Advantageously, the presence of the pads 14, which during actuation of the electrostatic micromotor 1 provide a localized and distributed contact between the rotor substrate 3 and the stator substrate 2, enables a further reduction in the force of friction.

The pads 14 are, for example, deposited on the resulting insulation layer 5 using the CVD technique, and shaped by means of an appropriate masking so as to assume an as a whole parallelepepidal shape, with a length (in the sliding direction x) of approximately 15 μm, a width (in the direction of extension y) of approximately 2 μm, and a thickness (in the orthogonal direction z) of less than 0.5 μm.

In particular (see also FIG. 5), the pads 14 are staggered with respect to one another in the sliding direction x and in the direction of extension y, and are as a whole arranged on the top surface of the resulting insulation layer 5 according to a "zigzag" pattern (in particular, this pattern extends between opposite sides of the surface). In addition, the pads 14 are spaced apart by an interval of approximately 50 μm in the direction of extension y, and overlap, one with respect to the following, by approximately 5 μm in the sliding direction x.

Figure 4:
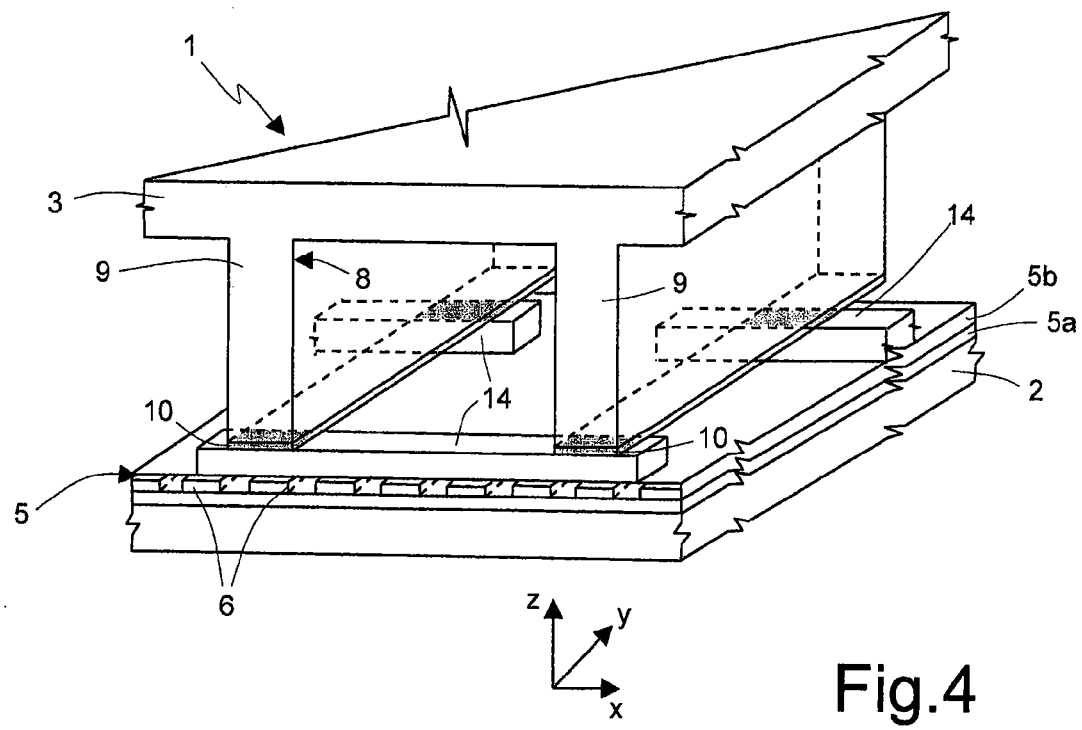
FIG. 4 shows a perspective cross section through an electrostatic micromotor in accordance with a second embodiment.
Figure 5:
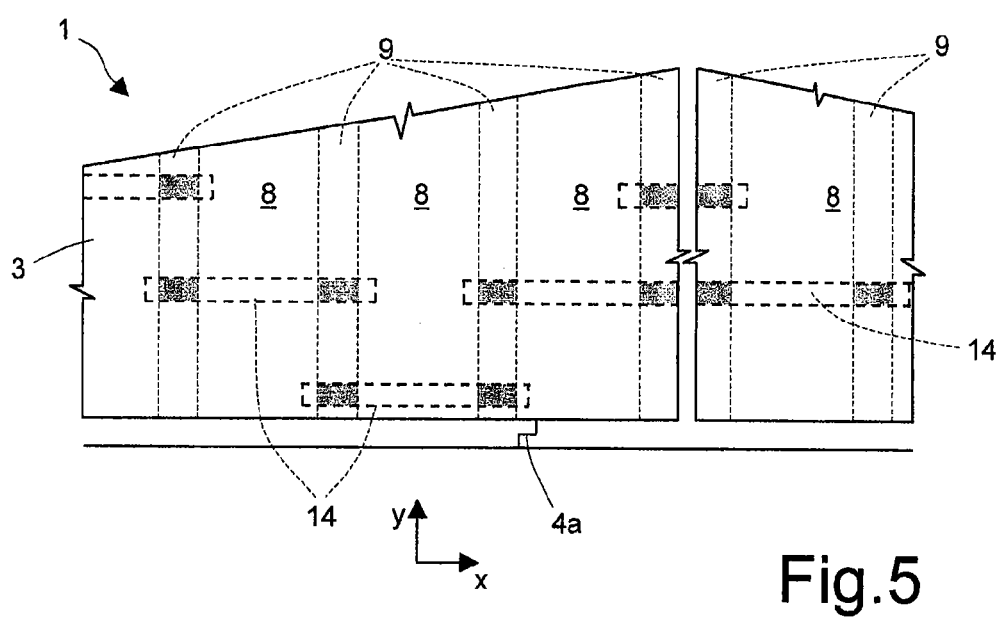
FIG. 5 shows a simplified top view of a portion of the micromotor of FIG. 4.

During actuation of the electrostatic micromotor 1, the rotor projections 9 (and the associated dielectric regions 10) are directly in contact with the underlying pads 14 (the portions in contact of the facing surfaces of the pads 14 and of the rotor projections 9 are highlighted in FIGS. 4 and 5). In particular, the pads 14 are arranged in such a way that each rotor projection 9 is set in contact with at least one of the pads 14 so as to provide a uniformly distributed support for the rotor substrate 3.

Furthermore, each pad 14 is set in contact with at least two rotor projections 9. In use, the electrostatic interaction force between the stator electrodes 6 and the rotor projections 9 causes sliding of the rotor projections 9 on the pads 14 (which are fixed and rigidly connected to the stator substrate 2), along the sliding direction x.

Figure 6:
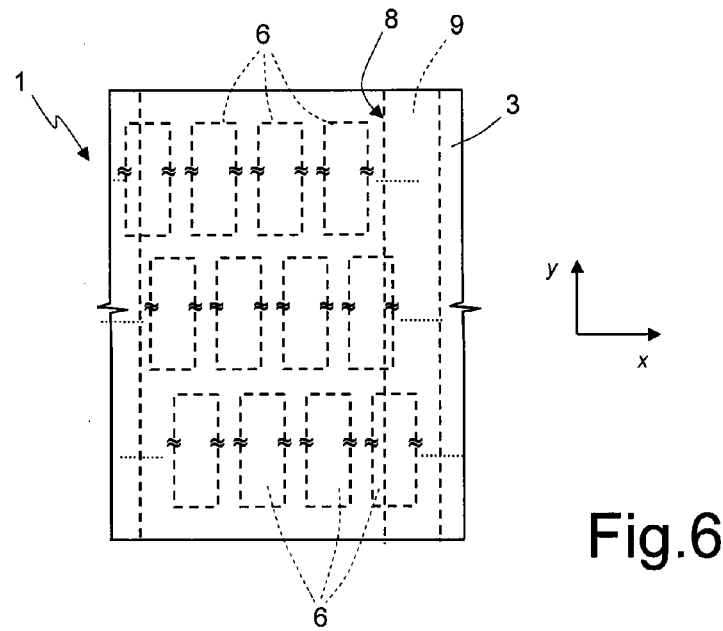
FIG. 6 shows a simplified top view of a portion of an electrostatic micromotor according to one embodiment.

According to one embodiment (FIG. 6), the stator electrodes 6 have, in the direction of extension y, an extension less than a corresponding extension of the rotor projections 9 (which, instead, extend throughout the rotor substrate 3), for example, less than one third of said extension (so that, in all, three stator electrodes 6 follow one another in the direction of extension y). Furthermore, stator electrodes 6 adjacent in the direction of extension y have a range of overlapping, for example, of 1 μm, in the sliding direction x.

This arrangement of the stator electrodes 6 means as a whole that there are no intervals without electrodes in the sliding direction x, and enables the electronic biasing unit 11 to optimize control of the electrostatic interaction force, having available a greater number of stator electrodes 6, each to be biased in an optimal portion of the curve of the force as a function of the position in the sliding direction x (the aforementioned area A, see again FIG. 2). In particular, it is possible to generate an actuation force in the sliding direction x that is substantially constant and without interruptions (or "voids"). For example, in the case where the area A of the curve of the electrostatic interaction force, in which the second biasing stage 11b biases the stator electrodes 6, has an extension of 3 μm in the sliding direction x, the second biasing stage 11b can be configured so as to bias at any instant two of the stator electrodes 6 (and the electrodes corresponding thereto in the periodic repetition of the stator electrodes 6) that come to overlap partially in the same sliding direction x; each electrode remaining "turned on" for an interval corresponding as a whole to a translation of 2 μm of the rotor substrate 3.

Figure 7:
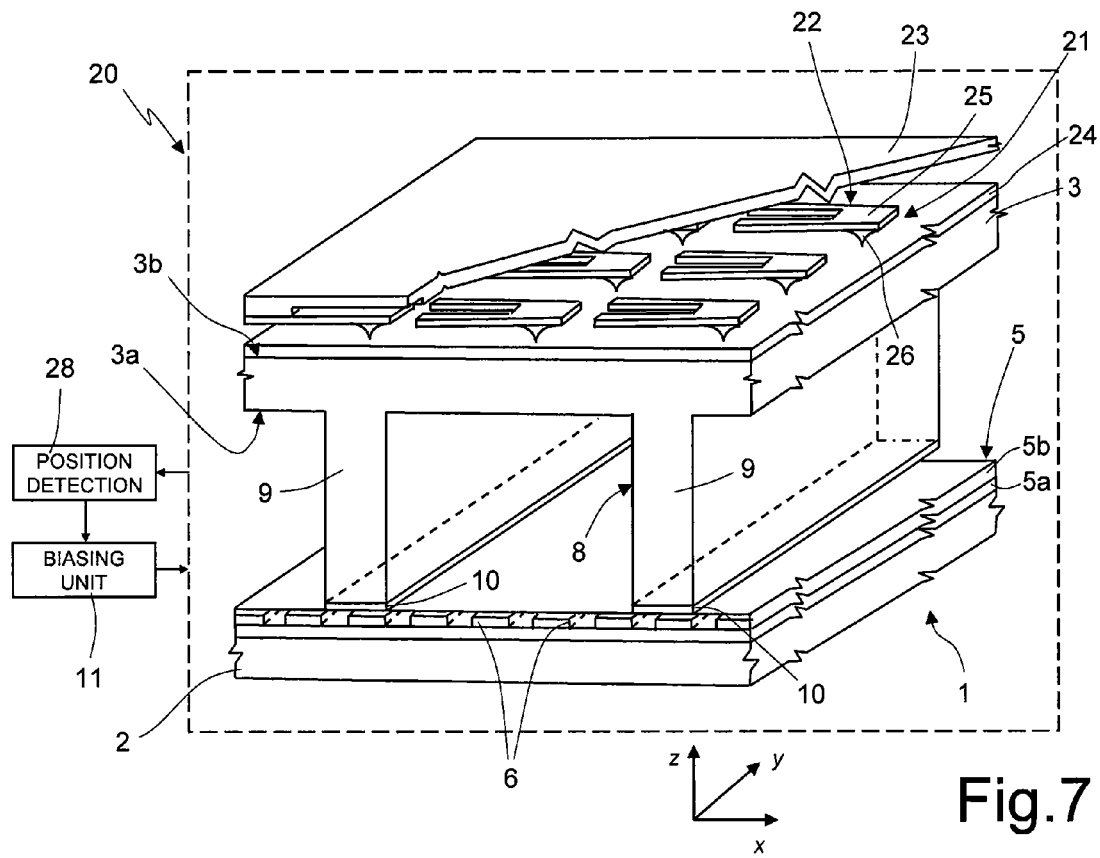
FIG. 7 is a perspective representation of a storage device of the probe-storage type, according to one embodiment.

The electrostatic micromotor 1 described can be advantageously used in an electronic storage device 20 of the probe-storage type, as illustrated in FIG. 7.

In detail, the storage device 20 comprises a two-dimensional array 21 of transducers (or probes) 22 fixed to a common substrate 23, for example made of silicon, made using CMOS technology. The two-dimensional array 21 is set above a storage medium 24, for example made of polymeric material, ferro-electric material, or phase-change material. Each probe 22 comprises a supporting element 25 of semiconductor material suspended in cantilever fashion above the storage medium 24, and an interaction element (or tip) 26 facing the storage medium 24, and carried by the supporting element 25 at a free end thereof. The interaction element 26 is configured so as to perform operations of reading, writing or erasure, interacting locally with an underlying portion of the storage medium 24.

The storage medium 24 is mechanically and fixedly coupled with respect to the electrostatic micromotor 1, in particular it is set on an outer surface 3b of the rotor substrate 3, opposite to the surface 3a facing the stator substrate 2. In this way, actuation of the electrostatic micromotor 1 causes a corresponding movement of the storage medium 24 in the sliding direction x, and a relative displacement thereof with respect to the probes 22. In particular, by appropriately driving the electrostatic micromotor 1 via the electronic biasing unit 11, it is possible to control positioning of the probes 22 at desired points of the storage medium 24, where it is desired to carry out operations of reading, writing, or erasure of the data stored in memory. It proves for this purpose convenient to provide a feedback control for actuation of the electrostatic micromotor 1 by using a position-detection stage 28, designed to detect the position of the micromotor (e.g., using the capacitive technique) and to transmit the information of detected position as a feedback to the electronic biasing unit 11.

From what has been described and illustrated, the advantages that the electrostatic micromotor according one embodiment enables are clear.

In the first place, the electrostatic approach for construction of the micromotor is generally advantageous in so far as it enables a compact structure to be obtained, stacked in a vertical direction. The rotor indentations 8 generate a variable capacitance between the stator electrodes 6 and the rotor substrate 3 and a consequent electrostatic interaction force, without requiring the presence of complex metal connections from the outside (the overall number of electrodes is in fact reduced).

In particular, positioning the stator substrate 2 and the rotor substrate 3 in contact during actuation enables undesirable effects due to the component of the interaction force orthogonal to the sliding direction x to be neglected. This contact further enables reduction of the constraints on the stiffness of the elastic elements 4a coupled to the rotor substrate 3, and limitation, in use, of deformations (e.g., in the form of warping) of the same rotor substrate 3.

The modulation at high frequency of the biasing voltage enables reduction by up to two orders of magnitude of the force of friction due to the contact between the substrates.

The electronic biasing unit 11 is advantageously configured so as to uncouple the actuation in the sliding direction x (for the desired translation of the rotor substrate 3) from the actuation in the orthogonal direction z (for the attraction between the stator substrate 2 and the rotor substrate 3), optimizing the control of the electrostatic micromotor 1.

Once again it is emphasized that the presence of the pads 14 as distributed supporting and contact elements located between the stator substrate 2 and the rotor substrate 3, and in particular the reduced thickness of the same pads in the orthogonal direction z and the low coefficient of friction of the material of which they are made, enable further reduction of the friction between the substrates.

Finally, it is clear that modifications and variations can be made to what has been described and illustrated herein, without thereby departing from the scope of the disclosure.

In particular, the electronic biasing unit 11 could bias stator electrodes 6 that are adjacent in the sliding direction x and/or in the direction of extension y with voltages of different value (e.g., 50 V and 100 V), or else of opposite value (having, for example, values comprised between +/−40 V and +/−80 V). Advantageously, the electrical field lines, upon application of opposite biasing voltages +/−V, become denser in the regions between consecutive stator electrodes 6, thus determining a "squeezing" effect of the resulting electrical field.

Resulting therefrom is an increase in the useful component and a decrease in the disturbance component of the electrostatic interaction force between the stator electrodes 6 and the rotor projections 9.

The dielectric regions 10 on the rotor projections 9 may not be present, and the pads 14, where envisaged, may be set directly in contact with the same rotor projections. This variant has the advantage of further increasing the simplicity of production of the electrostatic micromotor 1.

Furthermore, a different arrangement of the pads 14 on the stator substrate 2 could be envisaged; for example, there may not be any superposition of the pads in the sliding direction x, and the pads 14 could be arranged according to a different geometrical pattern.

The electrostatic micromotor 1 can also be used in other applications, different from the storage device described. For example, the micromotor can be used in an optical switch device of a per-se known type, for moving and orienting corresponding means for reflecting a light beam.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electrostatic micromotor comprising:
a fixed substrate;
a mobile substrate facing said fixed substrate and suspended over said fixed substrate at a separation distance in an operative resting condition;
an actuation unit configured to cause a relative movement of said mobile substrate with respect to said fixed substrate along a first direction of movement during an operative actuation condition, said actuation unit being further configured to move said mobile substrate in a second direction of movement transverse to the first direction, bring said mobile substrate and said fixed substrate into contact, and keep them in contact during said operative actuation condition.

2. The micromotor according to claim 1 wherein said actuation unit is configured to reduce a friction generated by contact between said mobile substrate and said fixed substrate during said relative movement.

3. The micromotor according to claim 1, further comprising first electrostatic-interaction elements coupled to said mobile substrate and second electrostatic-interaction elements coupled to said fixed substrate, wherein said actuation unit includes:
a first biasing stage configured to supply a first biasing signal to said second electrostatic-interaction elements, bring said mobile substrate and said fixed substrate into contact, and keep them in contact; and
a second biasing stage configured to supply a second biasing signal to said second electrostatic-interaction elements and cause said relative movement between said mobile substrate and said fixed substrate.

4. The micromotor according to claim 3 wherein said first biasing stage is configured to modulate at a high frequency said first biasing signal and cause vibrations of said mobile substrate in the second direction, transverse to said first direction of movement.

5. The micromotor according to claim 4, further comprising elastic elements coupled to said mobile substrate, and wherein said first biasing stage is configured to drive intermittently said first biasing signal in order to alternately strengthen and reduce an attraction force between said mobile substrate and said fixed substrate-, the attraction force configured to deform said elastic elements, a deformation of the plastic elements configured to cause a repulsion force between said mobile substrate and said fixed substrate.

6. The micromotor according to claim 5 wherein said first biasing signal includes a pulse train at a high frequency, in particular having a frequency greater than a mechanical cut-off frequency of an assembly of said mobile substrate and said elastic elements.

7. The micromotor according to claim 3 wherein:
said second electrostatic-interaction elements comprise electrodes carried by said fixed substrate and facing said mobile substrate;
said first electrostatic-interaction elements comprise projections extending from said mobile substrate toward said fixed substrate, and defining between them gaps, the projections being staggered with respect to said electrodes along said first direction of movement;
said first biasing stage is configured to apply said first biasing signal to a first set of said electrodes; and
said second biasing stage is configured to apply said second biasing signal to a second set of said electrodes.

8. The micromotor according to claim 7 wherein electrodes of said first set are arranged with respect to said mobile substrate to generate, when biased by said first biasing signal, an electrostatic interaction force having a main component along the second direction, transverse to said first direction of movement, and said electrodes of said second set are arranged with respect to said mobile substrate to generate, when biased by said second biasing signal, an electrostatic interaction force having a respective main component along said first direction of movement.

9. The micromotor according to claim 8 wherein, during said actuation condition, said first set comprises electrodes arranged underneath said projections, and said second set comprises electrodes arranged underneath said gaps.

10. The micromotor according to claim 9, further comprising supporting elements distributed on the fixed substrate and spaced from each other and configured to provide distributed contact points between said fixed substrate and said mobile substrate during said actuation condition.

11. The micromotor according to claim 10 wherein said supporting elements are set between said projections and said electrodes, said supporting elements being fixed to said fixed substrate, said mobile substrate being configured to slide on said supporting elements along said direction of movement during said actuation condition, a coefficient of friction between said supporting elements and said projections being lower than a coefficient of friction between said projections and said fixed substrate.

12. The micrometer of claim 11 wherein the supporting elements are made from DLC (Diamond Like Carbon).

13. The micromotor according to claim 11 wherein said supporting elements are arranged in such a way that during said actuation condition each of said projections is set in contact with at least one of said supporting elements, the supporting elements being spaced apart from each other along said first direction of movement and along a third direction transverse to said first direction of movement and to the second direction of movement, each supporting element being elongated in said first direction of movement.

14. An electronic system comprising:
an electrostatic micromotor coupled to a structure, the micromotor including:
a fixed substrate;
a mobile substrate facing said fixed substrate and suspended over said fixed substrate at a separation distance in an operative resting condition;
an actuation unit configured to cause a relative movement of said mobile substrate with respect to said fixed substrate along a first direction of movement during an operative actuation condition, said actuation unit being further configured to move said mobile substrate in a second direction of movement transverse to the first direction, bring said mobile substrate and said fixed substrate into contact, and keep them in contact during said operative actuation condition.

15. The electronic system according to claim 14 wherein the structure is a storage device of a probe storage type, the storage device comprising:
a storage medium fixedly coupled to said mobile substrate and configured to be moved along said first direction of movement during said actuation condition, and
an array of probes set above said storage medium and configured to locally interact with the storage medium.

16. The electronic system according to claim 15 wherein the actuation unit comprises a biasing circuit configured to supply a first biasing signal to electrodes of the fixed substrate, bring said mobile substrate and said fixed substrate into contact, and keep them in contact, the biasing circuit configured to supply a second biasing signal to the electrodes and cause said relative movement between said mobile substrate and said fixed substrate.

17. A method for actuating an electrostatic micromotor provided with a fixed substrate and a mobile substrate facing said fixed substrate and suspended over said fixed substrate at a given separation distance while in an operative resting condition, said method comprising:
bringing said mobile substrate and said fixed substrate into contact by moving the mobile substrate in a first direction of movement towards the fixed substrate;
maintaining contact of the mobile substrate and the fixed substrate during an operative actuation condition; and
causing a relative movement of said mobile substrate with respect to said fixed substrate along a second direction of movement during the operative actuation condition.

18. The method according to claim 17 comprising:
bringing said mobile substrate and said fixed substrate into contact by supplying a first biasing signal to electrostatic-interaction elements, the electrostatic interaction elements being coupled to said fixed substrate; and
causing the relative movement by supplying a second biasing signal to said electrostatic-interaction elements.

19. A device comprising:
a fixed substrate;
a mobile substrate above the fixed substrate;
a plurality of first electrostatic elements on the fixed substrate;
a plurality of second electrostatic elements on the mobile substrate, a distance between two adjacent second electrostatic elements in a first direction being greater than a distance between two adjacent first electrostatic elements in the first direction; and
a biasing circuit configured to provide a first biasing signal to one of the first electrostatic elements and provide a second biasing signal to a second one of the first electrostatic elements, the first biasing signal being configured to move the mobile substrate in a second direction transverse to the first direction, attract the mobile substrate to the fixed substrate, the second biasing signal configured to cause a movement of the mobile substrate relative to the fixed substrate in the first direction.

20. The device of claim 19 wherein the first biasing signal is configured to force the fixed and the mobile substrate to contact -each other during the movement.

21. The device of claim 20 wherein the mobile substrate is attached to an elastic member.

22. The device of claim 21 wherein the first biasing signal is modulated to periodically strengthen and weaken an attractive force between the fixed and mobile substrates during the movement according to a modulation frequency.

23. The device of claim 20, further comprising supporting members on the fixed substrate each elongated in the first direction and spaced apart from each other, wherein one of the second electrostatic elements is always in contact with at least one supporting member.

24. The device of claim 20 comprising:
a recording medium fixed to a top surface of the mobile substrate; and
an array of probes above the recording medium configured to read from and write to the recording medium.

25. A method comprising:
applying a first biasing voltage to a first electrode of a plurality of electrodes on a fixed substrate, the first electrode being positioned directly below a first electrostatic element of a plurality of electrostatic elements on a mobile substrate above the fixed substrate, the first biasing voltage forcing contact between the fixed and mobile substrates by moving the mobile substrate in a first direction towards the fixed substrate; and
applying a second biasing voltage to a second electrode of the plurality of electrodes, the second electrode being adjacent in a second direction to the first electrode and offset from the first electrostatic element in the second direction, the second biasing voltage forcing a movement of the mobile substrate in the second direction, the second direction being transverse to the first direction.

26. The method of claim 25 comprising:
removing the first and second voltages from the first and second electrodes respectively as the mobile substrate moves; and
maintaining contact and the movement between the fixed and mobile substrates by applying the first and second voltages to other electrodes of the fixed substrate.

27. The method of claim 25 comprising modulating the first biasing voltage according to a modulation frequency to periodically strengthen and weaken a force of attraction between the fixed and mobile substrates.

28. The method of claim 25 comprising:
positioning the mobile substrate so that a recording medium fixed to a top surface of the mobile substrate is in a desired position relative to an array of read/write probes above the recording medium; and
manipulating the probes to write data to the recording medium.

29. An electrostatic micromotor comprising:
a fixed substrate;
a mobile substrate facing the fixed substrate and suspended over the fixed substrate at a separation distance in an operative resting condition;

first electrostatic-interaction elements coupled to the mobile substrate;
second electrostatic-interaction elements coupled to the fixed substrate;
an actuation unit configured to cause a relative movement of the mobile substrate with respect to the fixed substrate along a direction of movement during an operative actuation condition, the actuation unit including:
a first biasing stage configured to supply a first biasing signal to the second electrostatic-interaction elements, bring the mobile substrate and the fixed substrate substantially into contact, and keep them in contact during the operative actuation condition, the first biasing stage being configured to modulate at a high frequency the first biasing signal and cause vibrations of the mobile substrate in a first direction, transverse to the direction of movement.

30. The micromotor of claim 29, further comprising:
a second biasing stage configured to supply a second biasing signal to the second electrostatic-interaction elements and cause the relative movement between the mobile substrate and the fixed substrate.

31. The micromotor of claim 29, further comprising:
elastic elements coupled to the mobile substrate; and
the first biasing stage being configured to drive intermittently the first biasing signal in order to alternately strengthen and reduce an attraction force between the mobile substrate and the fixed substrate, the attraction force configured to deform the elastic elements, a deformation of the plastic elements configured to cause a repulsion force between the mobile substrate and the fixed substrate.

32. The micromotor of claim 31 wherein the first biasing signal includes a pulse train at a high frequency, in particular having a frequency greater than a mechanical cutoff frequency of an assembly of the mobile substrate and the elastic elements.

33. An electrostatic micromotor comprising:
a fixed substrate;
a mobile substrate facing the fixed substrate and suspended over the fixed substrate at a separation distance in an operative resting condition;
first electrostatic-interaction projections extending from the mobile substrate toward the fixed substrate, the projections being separated from each other by gaps;
second electrostatic-interaction electrodes coupled to the fixed substrate and facing the mobile substrate, the electrodes being staggered with respect to the projections along a direction of movement; and
an actuation unit configured to cause a relative movement of the mobile substrate with respect to the fixed substrate along the direction of movement during an operative actuation condition, the actuation unit including:
a first biasing stage configured to supply a first biasing signal to a first set of the second electrostatic-interaction electrodes, bring the mobile substrate and the fixed substrate substantially into contact, and keep them in contact during the operative actuation condition, the first biasing signal being configured to generate an electrostatic interaction force having a main component along a first direction, transverse to the direction of movement; and
a second biasing stage configured to supply a second biasing signal to a second set of the second electrostatic-interaction electrodes and cause the relative movement between the mobile substrate and the fixed substrate, the second biasing signal being configured to generate an electrostatic interaction force having a respective main component along the direction of movement.

34. The micromotor of claim 33 wherein, during the actuation condition, the first set of electrodes is arranged underneath the projections and the second set of electrodes is arranged underneath the gaps.

35. The micromotor of claim 34, further comprising supporting elements on the fixed substrate and spaced from each other and configured to provide distributed contact points between the fixed substrate and the mobile substrate during the actuation condition.

36. A device comprising:
a fixed substrate;
a mobile substrate above the fixed substrate;
a plurality of first electrostatic elements on the fixed substrate;
a plurality of second electrostatic elements on the mobile substrate, a distance between two adjacent second electrostatic elements in a first direction being greater than a distance between two adjacent first electrostatic elements in the first direction; and
a biasing circuit configured to provide a first biasing signal to one of the first electrostatic elements, provide a second biasing signal to a second one of the first electrostatic elements, and cause a movement of the mobile substrate relative to the fixed substrate in the first direction, the first biasing signal configured to attract the mobile substrate to the fixed substrate to contact each other during the movement and the first biasing signal being modulated to periodically strengthen and weaken an attractive force between the fixed and mobile substrates during the movement according to a modulation frequency.

37. The device of claim 36, further comprising supporting members on the fixed substrate each elongated in the first direction and spaced apart from each, one of the second electrostatic elements being in continuous contact with one of the supporting members.

38. The device of claim 36, further comprising:
a recording medium fixed to a top surface of the mobile substrate; and
an array of probes positioned above the recording medium and configured to read from and write to the recording medium.

39. A method comprising:
applying a first biasing voltage to a first electrode of a plurality of electrodes on a fixed substrate, the first electrode being positioned directly below a first electrostatic element of a plurality of electrostatic elements on a mobile substrate above the fixed substrate, the first biasing voltage forcing contact between the fixed and mobile substrates;
applying a second biasing voltage to a second electrode of the plurality of electrodes, the second electrode being adjacent in a first direction to the first electrode and offset from the first electrostatic element in the first direction, the second biasing voltage forcing a movement of the mobile substrate in the first direction; and
modulating the first biasing voltage according to a modulation frequency to periodically strengthen and weaken a force of attraction between the fixed and mobile substrates.

40. The method of claim 39, further comprising:
removing the first and second voltages from the first and second electrodes respectively as the mobile substrate moves; and maintaining contact and the movement between the fixed and mobile substrates by applying the first and second voltages to other electrodes of the fixed substrate.

* * * * *